US011562187B2

(12) United States Patent
Kuroda et al.

(10) Patent No.: US 11,562,187 B2
(45) Date of Patent: Jan. 24, 2023

(54) PRINTING APPARATUS HAVING AN EXPANDABLE HOUSING AND PRINTING CONTROL METHOD

(71) Applicant: CANON KABUSHIKI KAISHA, Tokyo (JP)

(72) Inventors: Toshiyuki Kuroda, Kawasaki (JP); Kazuhisa Fujino, Kawasaki (JP); Naoki Aoyama, Tokyo (JP); Syunichi Kunihiro, Kawasaki (JP); Hiroshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 16/884,252

(22) Filed: May 27, 2020

(65) Prior Publication Data

US 2020/0380321 A1 Dec. 3, 2020

(30) Foreign Application Priority Data

May 29, 2019 (JP) .............................. JP2019-100314

(51) Int. Cl.
*G06K 15/00* (2006.01)
*G06K 15/02* (2006.01)
*G06K 15/10* (2006.01)

(52) U.S. Cl.
CPC ......... *G06K 15/005* (2013.01); *G06K 15/102* (2013.01); *G06K 15/1822* (2013.01)

(58) Field of Classification Search
None
See application file for complete search history.

(56) References Cited

U.S. PATENT DOCUMENTS

| 10,427,427 | B2 | 10/2019 | Suzuki | |
|---|---|---|---|---|
| 2003/0202083 | A1* | 10/2003 | Deguchi | ................... B41J 29/13 347/108 |
| 2019/0016159 | A1* | 1/2019 | Suzuki | ................ B41J 13/0045 |
| 2020/0039773 | A1* | 2/2020 | Fujino | ................ H04N 1/00076 |

FOREIGN PATENT DOCUMENTS

| JP | H05-138990 A | | 6/1993 | |
|---|---|---|---|---|
| JP | 2006213467 A | * | 8/2006 | ........... G06K 15/005 |

\* cited by examiner

*Primary Examiner* — Mohammad H Ghayour
*Assistant Examiner* — Pawan Dhingra
(74) *Attorney, Agent, or Firm* — Venable LLP

(57) ABSTRACT

A printing apparatus includes a printing head to move in a first direction, a conveying roller to convey the printing medium in a second direction intersecting with the first direction, and a housing to house the printing head and the conveying roller and be expandable and contractible in the first direction. The printing apparatus performs predetermined notification based on information related to a length of the housing in the first direction, wherein the conveying roller is incapable of conveying the printing medium having a predetermined size when the length of the housing in the first direction is a first length and conveys the printing medium having the predetermined size in a case where the length is a second length larger than the first length. The predetermined notification is performed based on the information related to the length of the housing indicating information corresponding to the first length.

17 Claims, 12 Drawing Sheets

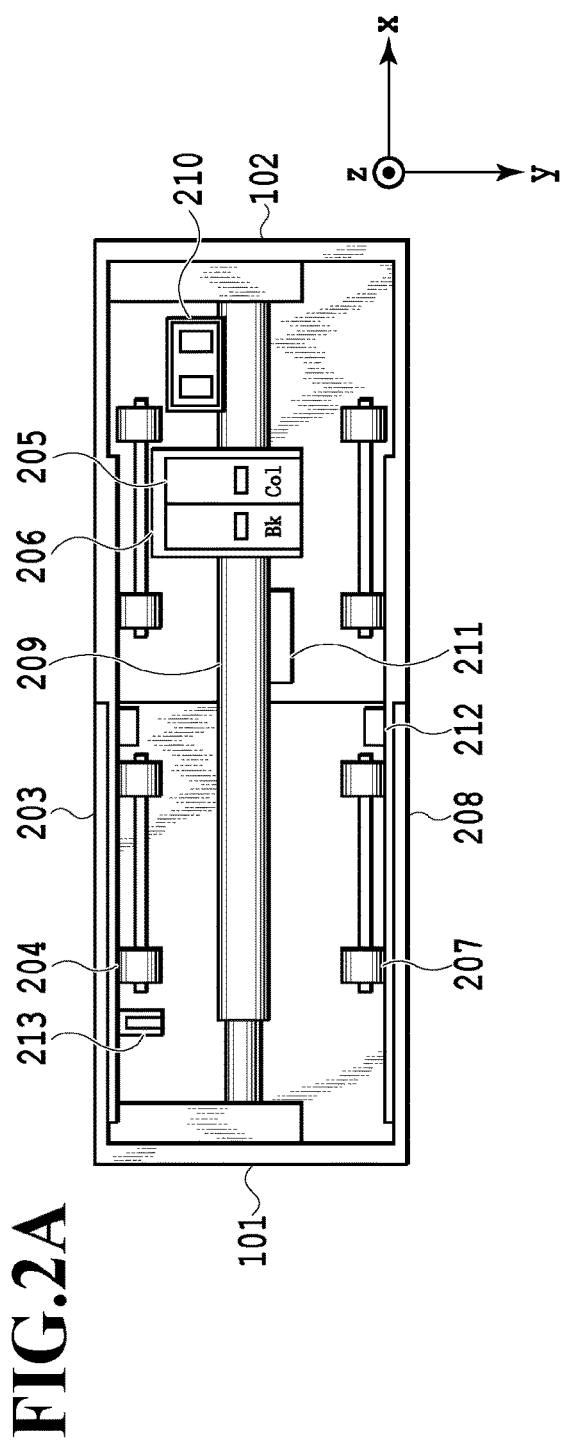
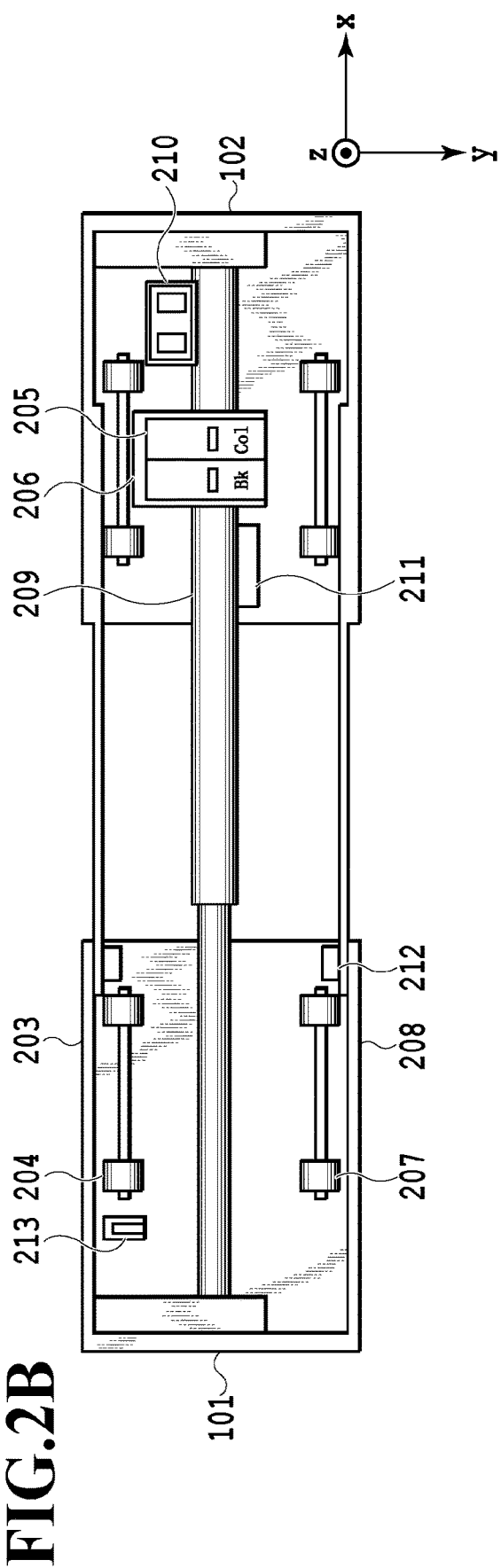

PRINTING APPARATUS HAVING AN EXPANDABLE HOUSING AND PRINTING CONTROL METHOD

BACKGROUND OF THE INVENTION

Field of the Invention

The present invention relates to a printing apparatus, a printing control method, and a processing apparatus, which are capable of expanding and contracting a width of an apparatus by sliding a housing.

Description of the Related Art

Japanese Patent Laid-Open No. H05-138990 discloses a printer including a side case slidably provided in a direction perpendicular to a paper feeding direction. The printer according to Japanese Patent Laid-Open No. H05-138990 is configured to slide the side case in a case where the printer is not in use so as to reduce its width dimension nearly a half as large as that in a case where the printer is expanded to a maximum width, thereby keeping the printer from being bulky during carrying. In this printer, the side case is slid and expanded so that the printer can print on a printing medium while covering a printing area corresponding to a length after the expansion.

However, in a case where the printer according to Japanese Patent Laid-Open No. H05-138990 performs printing based on print settings set by a user, it is not possible to check whether or not a state of expansion or contraction of the side case complies with a state where the printer can perform the printing set by the user. For this reason, this printer may cause problems such as the occurrence of rework to abort a printing operation as the user recognizes a mismatch between the state of expansion or contraction and the print settings after the start of the printing operation and to restart the printing operation after adjusting the state of expansion or contraction, and a failure to obtain an output result intended by the user due to the mismatch between the state of expansion or contraction and the print settings.

SUMMARY OF THE INVENTION

In view of the above, it is an object of the present invention to provide a printing apparatus, a printing control method, and a processing apparatus, which suppress the occurrence of rework after a start of a printing operation and suppress an output of a printing result not intended by a user due to a mismatch between a state of expansion or contraction and print settings.

To this end, a printing apparatus of the present invention is a printing apparatus configured to perform printing on a printing medium, which includes: a printing unit configured to convey the printing medium and to perform a printing operation to print on the conveyed printing medium; a housing configured to be slid in a sliding direction intersecting with a conveyance direction of the printing medium and to be movable to a first position and to a second position where a width dimension of the apparatus becomes larger than a width dimension of the apparatus in a case where the housing is located at the first position; a control unit configured to perform control of print processing inclusive of the printing operation by the printing unit; and a notification unit configured to perform notification to a user to urge sliding the housing to increase the width dimension of the housing in a case where the housing is located at the first position. Here, the printing unit is incapable of conveying the printing medium having a predetermined size in the case where the housing is located at the first position and is capable of conveying the printing medium in a case where the housing is located at the second position. Moreover, in a case where notification is performed by the notification unit, the control unit performs the control of the print processing on a condition that the housing is moved to the second position.

According to the present invention, it is possible to realize a printing apparatus and a printing control method, which suppress the occurrence of rework after a start of a printing operation and suppress an output of a printing result not intended by a user due to a mismatch between a state of expansion or contraction and print settings.

Further features of the present invention will become apparent from the following description of exemplary embodiments with reference to the attached drawings.

BRIEF DESCRIPTION OF THE DRAWINGS

FIGS. 2A and 2B are cross-sectional views in a horizontal direction illustrating the printing apparatus;

DESCRIPTION OF THE EMBODIMENTS

First Embodiment

A first embodiment will be described below with reference to the accompanying drawings. Note that the following embodiments are not intended to limit the scope of the present invention as defined in the appended claims. It is to be also understood that a combination of all the features described in each of the embodiments are not always essential for a solution according to the present invention.

Figure 1:
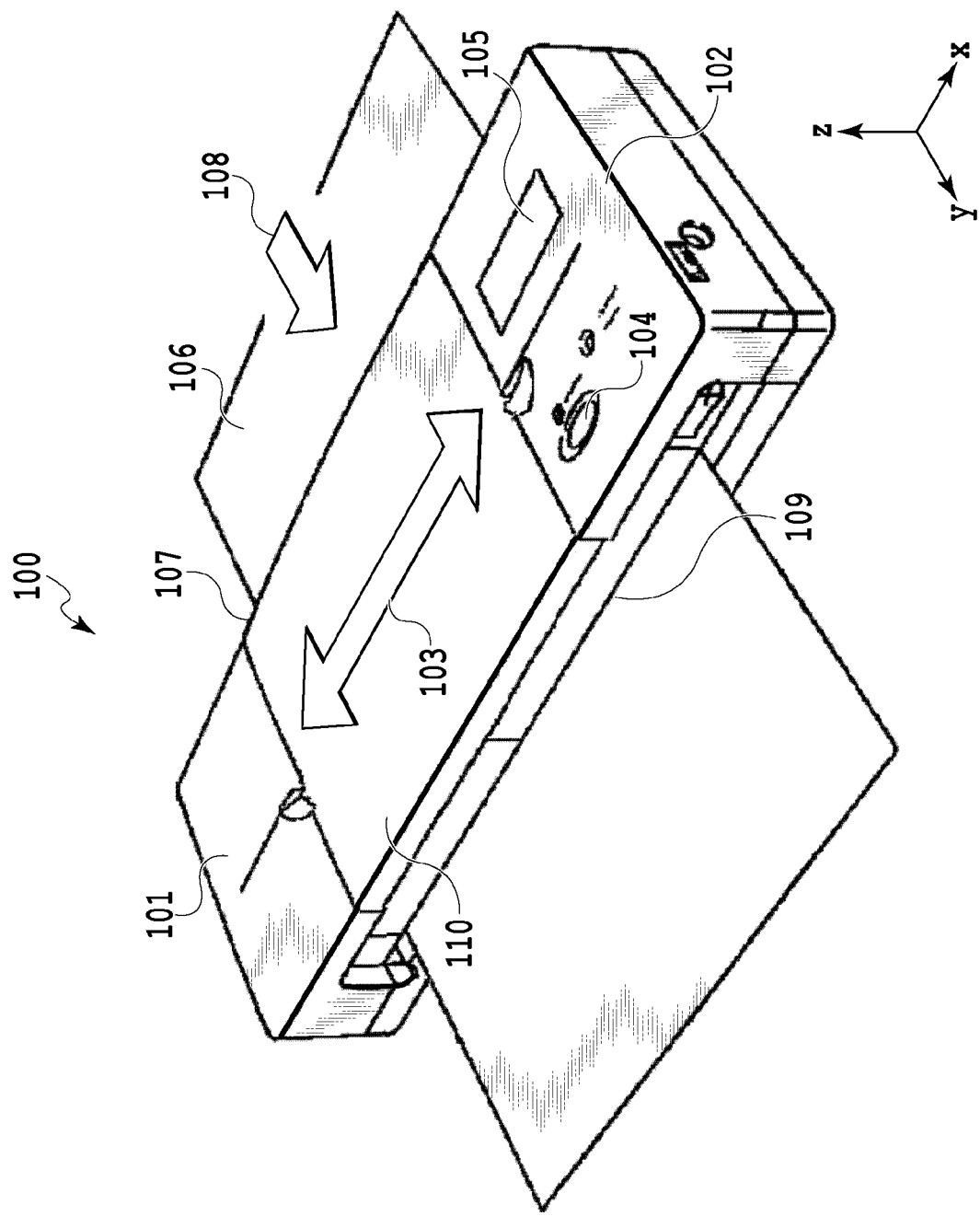
FIG. 1 is a perspective view illustrating a printing apparatus.

FIG. 1 is a perspective view illustrating a printing apparatus 100 to which this embodiment is applicable. The printing apparatus 100 feeds a printing medium 106 from a feeding port 107, performs printing by ejecting a liquid (hereinafter also referred to as an ink) onto the printing medium 106, and then discharges the printing medium 106 from a discharging port 109. Meanwhile, the printing apparatus 100 includes a first side case 101 and a second side case 102 collectively serving as part of a housing. The first side case 101 and the second side case 102 are made movable while being slid in ±x directions. A width dimension of the printing apparatus 100 can be changed by sliding the first side case 101 and the second side case 102 in sliding directions which are the ±x directions. Thus, the printing apparatus 100 can print on printing media 106 having various widths.

The second side case 102 includes an operating button 104 and an indicator LCD 105 located on a surface that defines an upper surface of the printing apparatus 100. A state of power on or off can be checked by using the indicator LCD 105. Moreover, the operating button 104 is provided with an LED and it is possible to notify of an operating state of the printing apparatus 100 by turning the LED on and off. Trays for supporting the printing media 106 may be provided to the feeding port 107 and the discharging port 109, although such trays are not provided to the printing apparatus 100 in FIG. 1. An access cover 110 is provided to the surface defining the upper surface of the printing apparatus 100. It is possible to have access to the inside of the printing apparatus by opening the access cover 110, and to perform maintenance processing on the printing apparatus 100 by having access to the inside of the printing apparatus. Details of processing during such a maintenance operation will be described later.

FIG. 2A is a cross-sectional view in a horizontal direction illustrating the printing apparatus 100 in a state of contracting the first side case 101 and the second side case 102, and FIG. 2B is a cross-sectional view in the horizontal direction illustrating the printing apparatus 100 in an expanded state thereof. In the printing apparatus 100, each printing medium 106 (see FIG. 1) is conveyed in a conveyance direction which is y direction intersecting with the sliding direction of the housing. A carriage supporting unit 209 that supports a carriage 206 is provided inside the printing apparatus 100. It is possible to print on the printing medium 106 by reciprocating the carriage 206 along the carriage supporting unit 209 and ejecting ink droplets from ejection ports of a printing head 205 loaded on the carriage 206 onto the printing medium 106 along with the movement of the carriage 206. Although this embodiment describes an example of a serial printer in which the carriage 206 moves along the carriage supporting unit 209, the printer may instead be any of a line printer and a page printer which are expandable and contractible.

In a case where the printing apparatus 100 is not in use, the first side case 101 and the second side case 102 are slid by a pushing operation, thus bringing the printing apparatus 100 into a contracted state of a width dimension in the x direction perpendicular to the conveyance direction (the y direction) as illustrated in FIG. 2A. In this instance, the width dimension of the printing apparatus 100 is defined as a first width. On the other hand, in a case where the printing apparatus 100 is in use, the first side case 101 and the second side case 102 are slid by a pulling operation, thus bringing the printing apparatus 100 into an expanded state of the width dimension as illustrated in FIG. 2B. In this instance, the width dimension of the printing apparatus 100 is defined as a second width. The second width is larger than the first width. In the meantime, the first width is a minimum width of the printing apparatus 100 while the second width is a maximum width of the printing apparatus 100.

In the case of using the printing apparatus 100, the first side case 101 and the second side case 102 are slid and expanded in order to perform the printing. Meanwhile, the printing apparatus 100 is designed to be contracted by sliding the first side case 101 and the second side case 102 in the case where the printing apparatus 100 is not in use, and is thus designed to be portable with a reduced width dimension. Here, the case of the printing apparatus 100 not in use is a case of putting the printing apparatus 100 in a bag, a case, or the like for carrying while the case of the printing apparatus 100 in use is a case of printing on the printing medium, for example. The first width is assumed to be a contracted width of the printing apparatus 100 not in use and the second width is assumed to a width of the printing apparatus 100 in use. Note that the printing apparatus 100 may be expandable and contractible stepwise.

For example, the first width in the case of the printing apparatus 100 not in use is a width corresponding to a contracted state of a moving region of the carriage 206 to be described later. However, it is also possible to further reduce the width from the first width by folding a portion (such as a handle) of the side case after contracting the moving region of the carriage 206. On the other hand, the second width in the case of the printing apparatus 100 in use is a width suitable for the movement of the carriage 206 to be described later. However, in a case where the housing is expandable further, the printing apparatus 100 can also be expanded to a larger width than the second width irrespective of the moving region of the carriage 206.

Along with an expanding operation to expand the printing apparatus 100 in the state with the reduced width dimension by sliding the first side case 101 and the second side case 102 according to the pulling operation, the carriage supporting unit 209 is also expanded. The carriage 206 can move along the expanded carriage supporting unit 209, and the moving region can be increased as a consequence of expansion of the carriage supporting unit 209. In other words, the printing apparatus 100 can change its printing area in conjunction with the state of expansion or contraction of the apparatus, thus performing the printing on the printing medium in a size corresponding to the state of expansion or contraction.

In the printing apparatus 100, a cap 210 is provided at an end portion of the moving region of the carriage 206. The cap 210 is disposed at a position opposed to the printing head 205 loaded on the carriage 206 located at the end portion of the moving region. The cap 210 comes into close contact with an ejection port surface where the ejection ports of the printing head 205 are provided, and blocks the ejection surface from atmosphere in the case where the printing is not performed. Thus, the cap 210 can protect the ejection ports and the ejection port surface against desiccation. This makes it possible to suppress changes in conditions of the inks such as condensation of the inks in the ejection ports and adhesion of the inks onto the ejection port surface. In the state where the cap 210 is in close contact with the printing head 205, it is possible to maintain the state of close contact between the cap 210 and the printing head 205 even if the printing apparatus 100 is tilted or if vibration is applied to the printing apparatus 100.

Moreover, the cap 210 is connected to a not-illustrated decompression unit, so that a negative pressure can be applied to the ejection ports of the printing head 205 by driving the decompression unit while bringing the cap 210 into close contact with the printing head 205. By applying the negative pressure to the inside of the ejection ports as described above, it is possible to discharge the inks that fall into discharge trouble due to condensation, adhesion, or the like in the ejection ports. Accordingly, it is possible to fill the ejection ports with fresh uncondensed inks.

The printing apparatus 100 includes a paper gap change lever 213. The paper gap change lever 213 is a lever used for changing a distance between the printing head 205 and the printing medium 106. The distance between the printing head 205 and the printing medium 106 can be changed by bringing the paper gap change lever 213 into contact with a not-illustrated member present on the carriage 206, which is capable of changing a distance between the carriage 206 and the carriage supporting unit 209.

The paper gap change lever 213 is configured to be able to switch between states of projecting and not projecting onto a moving path of the carriage 206. In order to change the distance between the printing medium 106 and the printing head 205, the paper gap change lever 213 is set to the projecting state and the carriage 206 is moved from the first side case 101 side toward the paper gap change lever 213. Then, the distance between the printing medium 106 and the printing head 205 can be reduced by bringing the paper gap change lever 213 into contact with the member to change the distance between the carriage 206 and the carriage supporting unit 209.

In a case other than changing the paper gap such as during the printing, the paper gap change lever 213 is set to the state not projecting onto the moving path of the carriage 206 such that the paper gap change lever 213 does not interfere with the carriage 206 in the case where the carriage 206 is moving.

Moreover, the printing apparatus 100 includes the feeding port 107 to feed the printing media 106, and a feeding roller 204 to feed the printing media 106 set on the feeding port 107. Furthermore, the printing apparatus 100 includes a discharging roller 207 to discharge the printing media 106 subjected to the printing, and the discharging port 109 to discharge the printing media 106. The printing apparatus 100 conveys the printing media 106 by using these components. Nonetheless, the printing apparatus 100 cannot convey the printing media 106 if its width is in the state illustrated in FIG. 2A and can convey the printing media 106 if its width is in the state illustrated in FIG. 2B. Note that even if the width of the printing apparatus 100 is shorter than that in the state illustrated in FIG. 2B, the printing apparatus 100 can convey the printing media 106 in the state where the printing apparatus 100 at least has a width corresponding to the width of the printing media 106.

Figure 3:
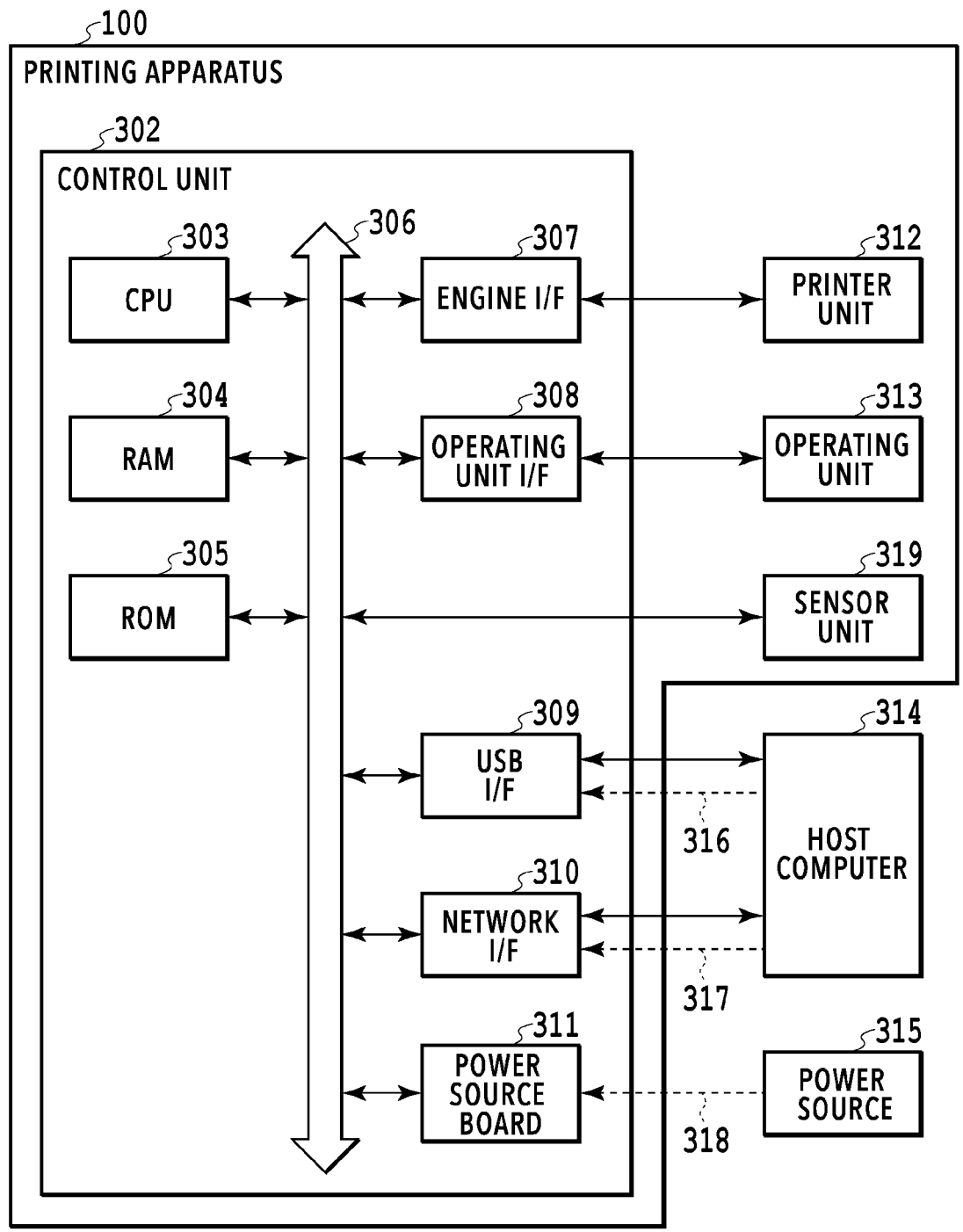
FIG. 3 is a block diagram illustrating a hardware configuration of the printing apparatus.

FIG. 3 is a block diagram illustrating a hardware configuration of the printing apparatus 100. The printing apparatus 100 causes a CPU 303 included in a control unit 302 to load a control program recorded in a ROM 305 into a RAM 304, and to perform various control such as power-on control and printing control by reading the control program as needed. The RAM 304 is a main storage memory for the CPU 303, which is used as a work area or as a temporary storage area for loading various programs stored in the ROM 305. The ROM 305 stores image data, various programs, and various setting information. Although the printing apparatus 100 is assumed to employ a flash storage or the like as the ROM 305, the printing apparatus 100 may adopt an auxiliary storage device such as a hard disk instead. Moreover, the printing apparatus 100 includes a sensor unit 319. Using the sensor unit 319, the printing apparatus 100 can acquire position information on the first side case 101 and the second side case 102 serving as slidable members and detect the state of expansion or contraction among others. A result of detection of the state of expansion or contraction by the sensor unit 319 is transmitted as a result of obtainment to a sliding state management application serving as an obtainment unit to be described later.

Here, the printing apparatus 100 is configured such that the single CPU 303 executes various processing illustrated in the flowcharts to be described later by using the single memory (the RAM 304). However, the printing apparatus 100 may adopt other configurations. For example, the printing apparatus 100 can also execute the respective processing illustrated in the flowcharts to be described later by bringing multiple CPUs and multiple RAMs, ROMs, and storage units into cooperation. Alternatively, the printing apparatus 100 may execute part of the processing by using a hardware circuit.

An engine interface (hereinafter referred to as the engine I/F) 307 connects a printer unit 312 to the control unit 302. The image data to be printed by the printer unit 312 is transferred by the control unit 302 through the engine I/F 307 and is printed on the printing medium such as paper by using the printer unit 312. An operating unit I/F 308 connects an operating unit 313 to the control unit 302. The operating unit 313 is provided with a liquid crystal display unit having a touch panel function, operation keys, and so forth and functions as a reception unit to receive instructions from a user.

A USB I/F 309 and a network I/F 310 control communication with a host computer 314 that is connected to the printing apparatus 100. A power source board 311 transforms electric power supplied from a power source 315 through a power source cable 318 and supplies the transformed electric power to the printing apparatus 100. Meanwhile, the power source board 311 may also be provided with a storage battery that can store the electric power.

Figure 4:
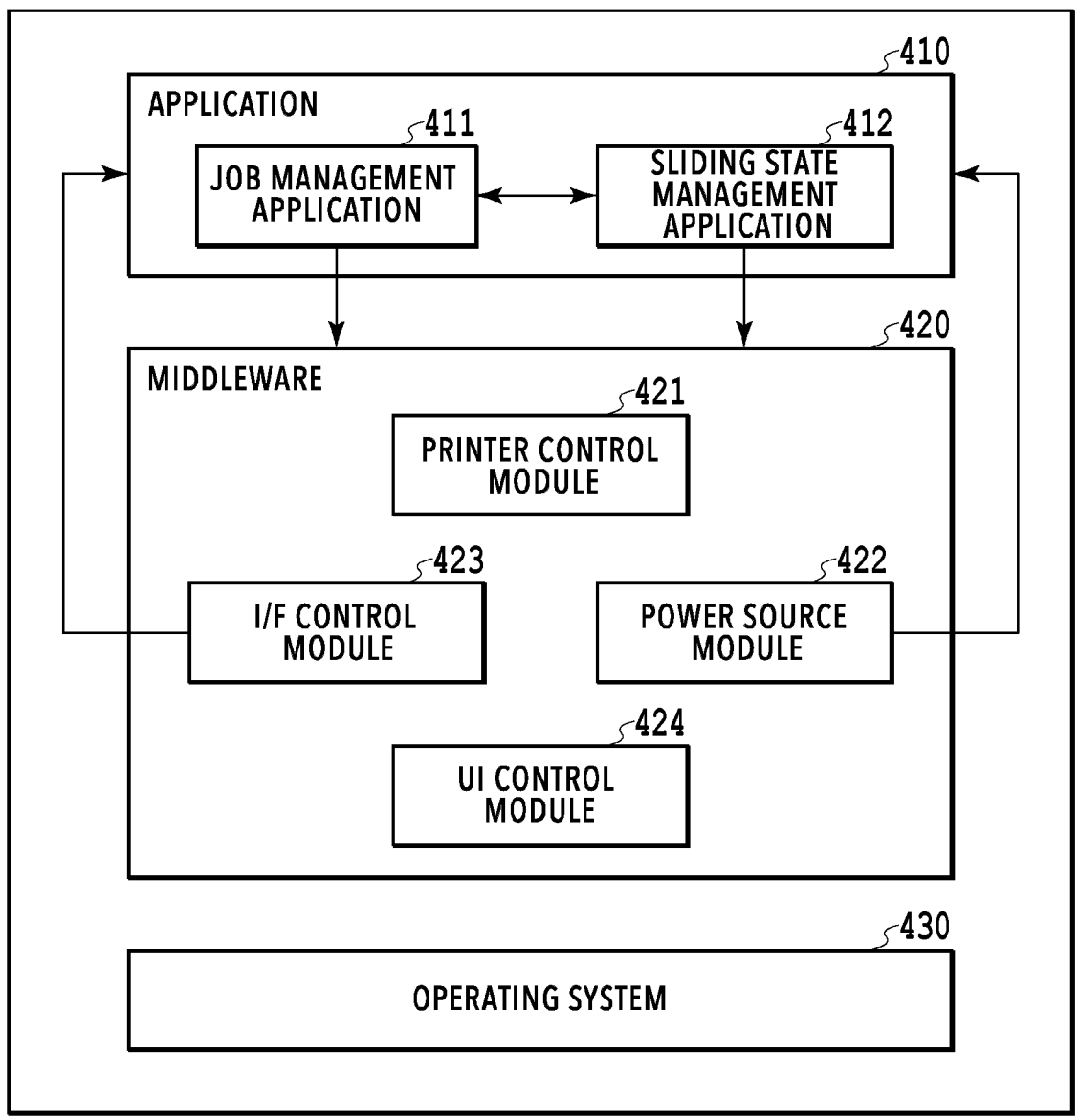
FIG. 4 is a software configuration diagram of a control program for the printing apparatus.

FIG. 4 is a software configuration diagram of the control program for controlling respective hardware modules loaded in the RAM 304 of the printing apparatus 100. The control program is divided into three layers of an application layer 410 to manage applications, a middleware layer 420 for controlling the printing apparatus 100 through the respective interfaces, and an operating system 430 to manage overall control.

The operating system 430 offers basic functions for causing the control unit 302 to execute the control program.

The middleware layer 420 is formed from a group of software for controlling the printer as well as the interfaces with the respective physical devices. In this embodiment, a printer control module 421 exists as a module for controlling the engine I/F 307. Likewise, the middleware layer 420 is formed from an I/F control module 423 to control the USB I/F 309 and the network I/F 310 which are the devices used for communication with the host computer 314, a UI control module 424 to control the operating unit I/F 308, and so forth.

The application layer 410 includes a job management application 411 and a sliding state management application 412, and realizes functions such as a printing function to be offered from the printing apparatus 100 to the user by operating the respective devices through the respective middleware modules. For example, in a case where the UI control module 424 detects an input of a printing instruction by the user through the operating unit 313 and the operating unit I/F 308, the application layer 410 is notified of the printing instruction. Upon receipt of the printing instruction, the application layer 410 executes processing based on the printing instruction by way of the job management application 411 for printing.

The job management application 411 executes the printing operation by the printer unit 312 while using the printer control module 421 in the middleware layer 420. The sliding state management application 412 controls the printer unit 312 by using the printer control module 421 in the middleware layer 420, thus managing the state of expansion or contraction of the printing apparatus 100. To be more precise, it is possible to perform mechanical control suitable for the length of the housing by changing operation parameters to be used by the printer control module 421 in accordance with sliding states of the first side case 101 and the second side case 102. In addition, the sliding state management application 412 assists user operations by controlling the UI control module 424 in cooperation with the job management application 411.

Figure 5:
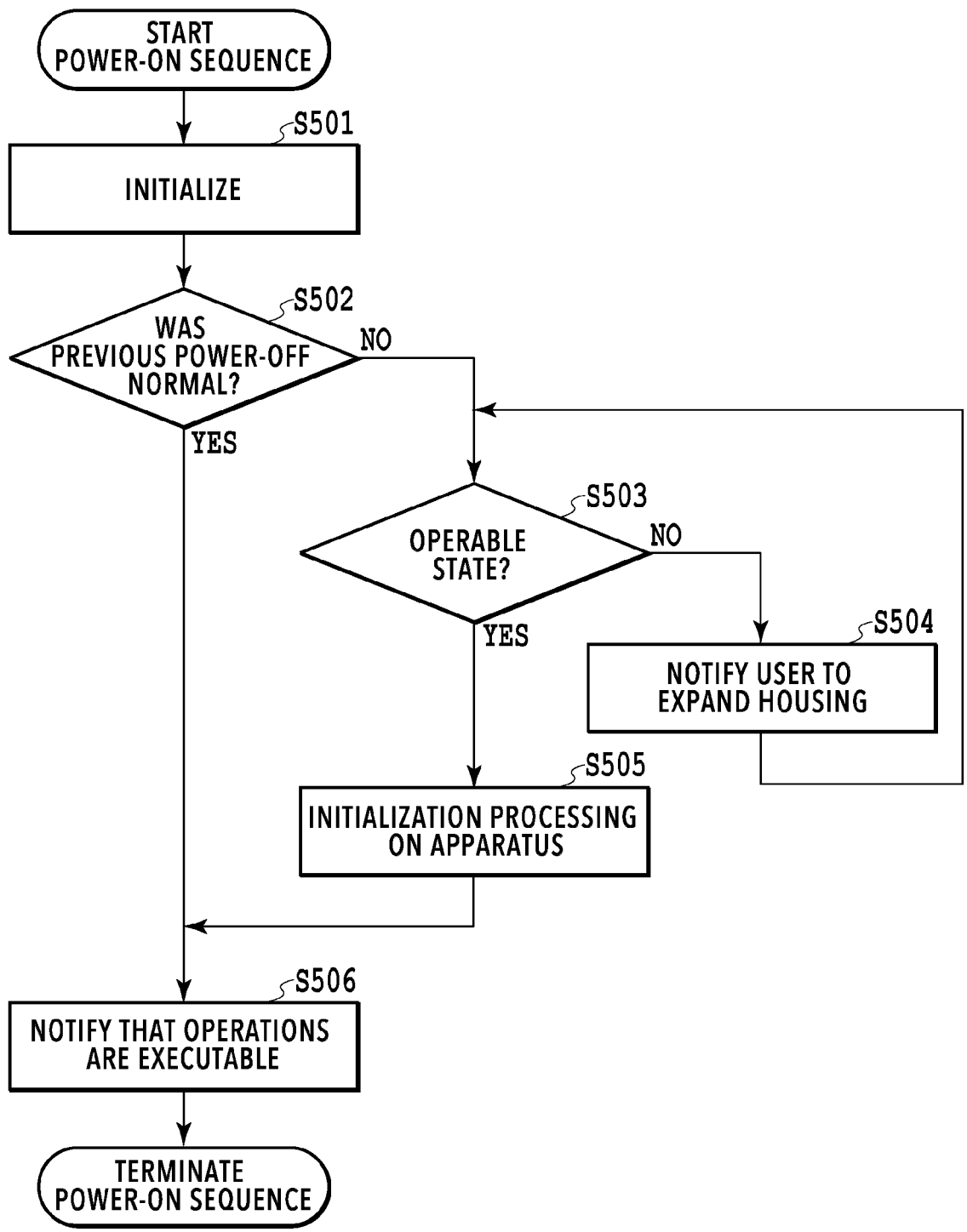
FIG. 5 is a flowchart illustrating a power-on sequence of the printing apparatus.

FIG. 5 is a flowchart illustrating a power-on sequence which is processing associated with printing and to be carried out in a case where a power-on operation of activation processing on the printing apparatus 100 takes place. Now, the power-on sequence of the printing apparatus 100 will be described below with reference to this flowchart. Note that the sliding state management application 412 is an agent of the respective processing unless otherwise specified in this sequence.

In a case where the power-on sequence at the time of activation is started, initialization processing on the control unit 302 is carried out in S501. In this initialization processing, various programs stored in the ROM 305 are loaded in the RAM 304, and the processing is carried out so as to enable the various control. Then, a determination is made in S502 as to whether or not a previous power-off operation was carried out normally. Here, the normal power-off operation means a state where the user operated the operating button 104 to turn off the power supply to the printing apparatus 100 and the power supply was turned off after achieving transition to a stable condition as the apparatus. On the other hand, an example of a failure to carry out the normal power-off operation means a state where the power supply from the power source 315 was lost in the course of printing due to a blackout, battery exhaustion, or the like whereby the power source was turned off without achieving transition to a stable condition as the apparatus.

The sequence proceeds to S506 in the case where the normal power-off was confirmed in S502. The sequence proceeds to S503 in the case where the normal power-off was not confirmed in S502. In the case where the sequence proceeds to S503, a determination is made as to whether or not an operable state is established. Here, the operable state means a state where the first side case 101 and the second side case 102 are slid and expanded to the second width by the pulling operation as illustrated in FIG. 2B. In the following, the description "operable state" means the state where the first side case 101 and the second side case 102 are slid and expanded to the second width by the pulling operation. In other words, even if the first side case 101 and the second side case 102 are slid and expanded partially by the pulling operation, such a state will not be hereinafter treated as the "operable state" since the moving region of the carriage is not sufficiently secured in this case.

Figure 10A:
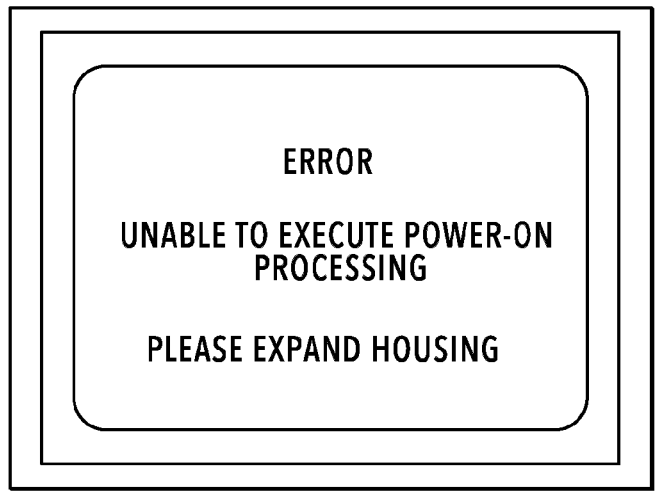
FIGS. 10A, 10B, and 10C are schematic diagrams illustrating display screens to be displayed on an indicator LCD.
Figure 10B:
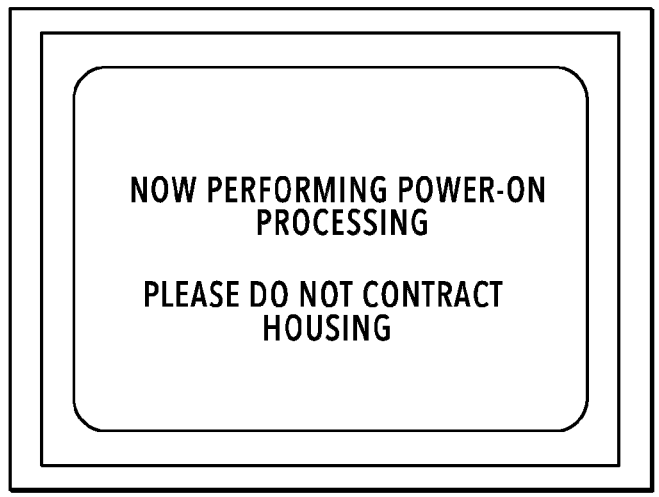
Figure 10C:
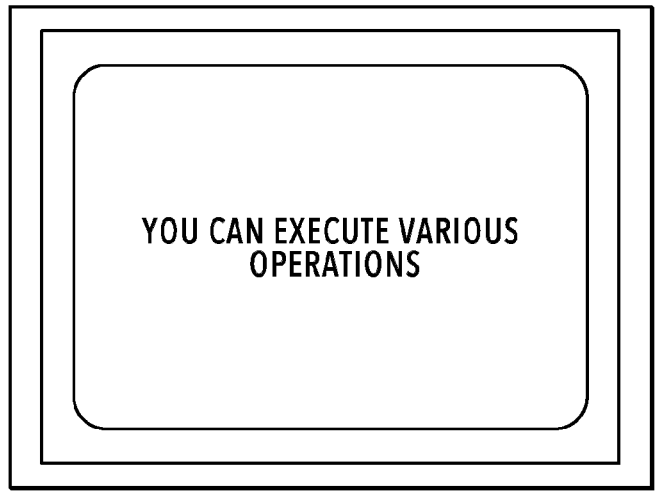

Now, FIGS. 10A to 10C are schematic diagrams illustrating display screens to be displayed on the indicator LCD 105 in the power-on sequence of this embodiment. In the case where the determination is made in S503 that the operable state is not established, the sequence proceeds to S504 where the UI control module 424 notifies the user to expand the housing as illustrated in FIG. 10A through the operating unit 313. In the case where the determination is made in S503 that the operable state is established, the sequence proceeds to S505 where the initialization processing on the apparatus is carried out. In the initialization processing in S505, the apparatus is initialized since the previous power-off operation was not carried out normally. During the initialization processing, a screen illustrated in FIG. 10B is displayed through the operating unit 313 to notify the user to contract the housing so as not to block the movement of the carriage 206 during an initialization operation, and the printing apparatus is initialized by controlling the printer unit 312. Thereafter, in S506, a screen illustrated in FIG. 10C is displayed through the operating unit 313 to notify the user that the various operations of the printing apparatus 100 are executable. Then, the power-on sequence is terminated. After the power-on sequence is terminated as described above, the printing apparatus 100 is in the operable state.

The power-on sequence has been described above. Next, a description will be given of the print processing. In the print processing by the printing apparatus 100 of this embodiment, the printing apparatus 100 checks the state of expansion or contraction of the housing before starting the printing operation to print on the printing medium. In the case where the printing apparatus 100 is not in the operable state, the printing apparatus 100 notifies the user of being not in the operable state and urges the user to expand the housing of the printing apparatus 100 to the second width. By checking the state of expansion or contraction of the housing before starting the printing operation as described above, it is possible to suppress the occurrence of rework to abort the printing operation as the user recognizes a mismatch between the state of expansion or contraction and the print settings after the start of the printing operation and to start the printing operation again after adjusting the state of expansion or contraction. Moreover, it is also possible to suppress an output of a printing result not intended by the user. Now, details of the print processing of this embodiment will be described below.

Figure 6:
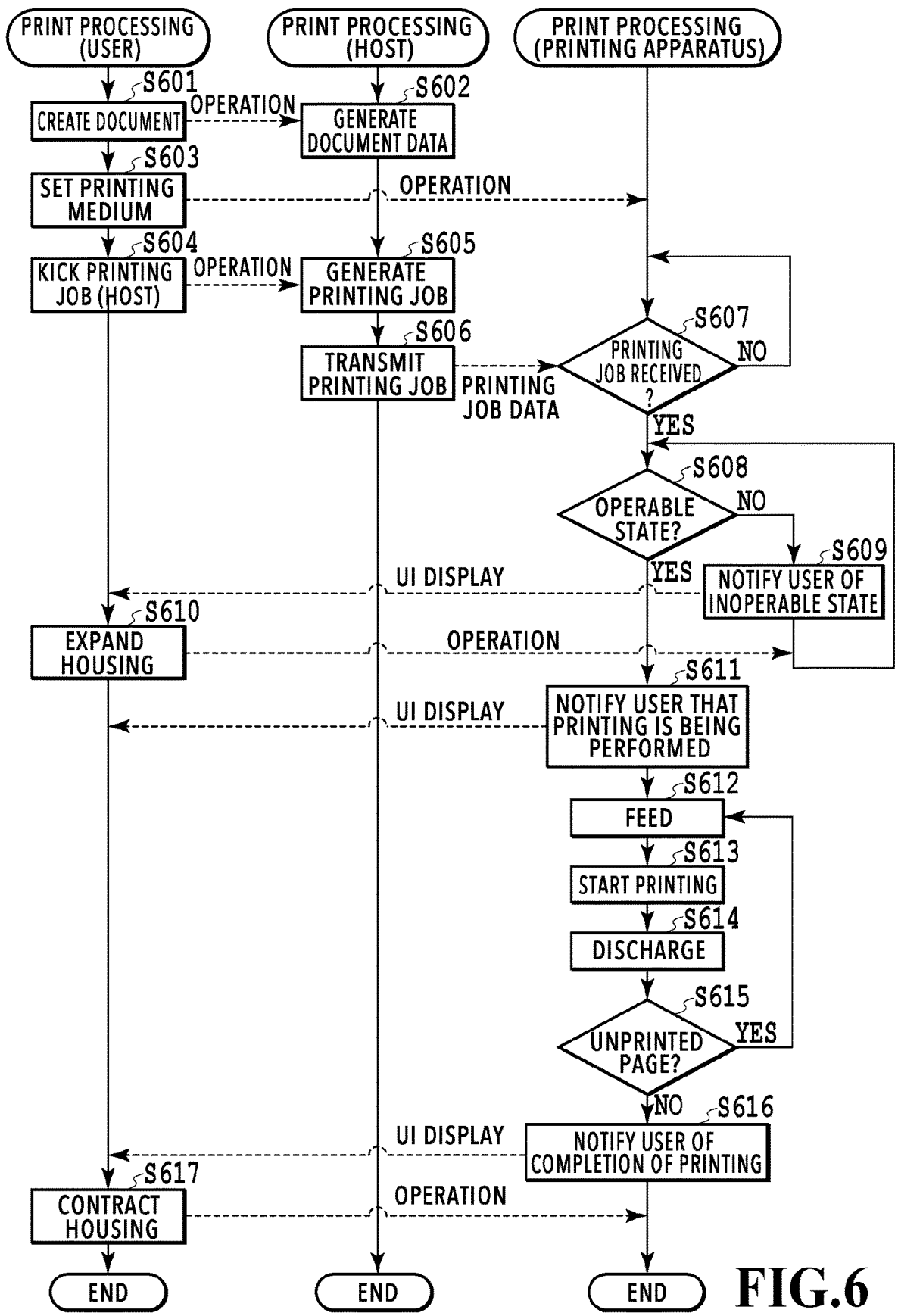
FIG. 6 is a flowchart illustrating print processing.

FIG. 6 is a flowchart illustrating processing to be performed by the user, the host computer 314, and the printing apparatus 100, respectively, in the print processing to print a created document. Operations to be performed by the user are also described herein for the convenience of explanation. Note that this processing is applicable not only to the example of printing a document but also to a case of printing an arbitrary image. Now, the processing by the user, the host computer 314, and the printing apparatus 100 in the printing processing will be described below with reference to this flowchart.

As the print processing is started, the user creates the document to be printed by using the host computer 314 in S601, and the host computer 314 generates printing data in S602. Thereafter, the user sets the printing medium 106 on the feeding port 107 of the printing apparatus 100 in S603. In S604, the user inputs an instruction to start printing to the host computer 314. Upon receipt of this instruction, the host computer 314 generates a printing job as a printing command in S605. After generating the printing job, the host computer 314 transmits the generated printing job to the printing apparatus 100 in S606. In S607, the control unit of the printing apparatus 100 determines whether or not the printing job is received, and stands by until receiving the printing job. In the case where the control unit determines in S607 that the printing job is received from the host computer 314, the control unit 302 of the printing apparatus 100 proceeds to S608 and determines whether or not the printing apparatus 100 is in the operable state. Specifically, the sliding state management application 412 determines whether or not the printing apparatus 100 is in the operable state.

Here, the printing apparatus 100 is in the operable state as a consequence of the termination of the power-on sequence described with reference to FIG. 5. Accordingly, in the case where the printing operation is carried out in this state (the operable state), the rework basically does not occur. However, after the termination of the power-on sequence, the user may conduct the printing operation or the like and the user may possibly contract the first side case 101 and the second side case 102 while retaining the power-on state along with completion of the printing. If the printing is started again in that state, the printing will be started without carrying out the above-described power-on sequence and the printing operation will be carried out while keeping the side cases contracted. In this case, the rework is prone to occur if the user does not recognize that the side cases are in the contracted state. For this reason, this embodiment is designed to determine whether or not the printing apparatus 100 is in the operable state before carrying out the printing operation in the course of the print processing.

Meanwhile, in this embodiment, the operable state represents the state where the first side case 101 and the second side case 102 are expanded to the second width. Accordingly, if the printing apparatus 100 is in the operable state, the printing apparatus 100 can deal with the printing on all the printing media printable with the printing apparatus 100. For this reason, as long as the printing apparatus 100 is in the operable state, it is possible to perform the printing in accordance with any print settings set by the user, and the printing result and the print settings set by the user never cause a mismatch.

Here, the operable state in S608 is not limited only to the state where the first side case 101 and the second side case 102 are expanded to the maximum width but may also be a state where the side cases are expanded to a different width. For example, a width corresponding to a paper size in the print settings set in the printing job received by the printing apparatus 100 is defined as the second width. Then, in S608, the printing apparatus 100 may be determined to be in the operable state in the case where the first side case 101 and the second side case 102 are expanded to the second width or above. In this instance, the second width is a width based on the shorter one of the longitudinal and lateral widths of the rectangular paper sheet corresponding to the paper size, for example. Here, the second width may be less than the length of the longer one of the longitudinal and lateral lengths of the rectangular paper.

Back to the flowchart in FIG. 6, the control unit of the printing apparatus 100 proceeds to S612 in the case where the printing apparatus 100 is in the operable state in S608, or proceeds to S609 in the case where the printing apparatus 100 is not in the operable state in S608.

Figure 11A:
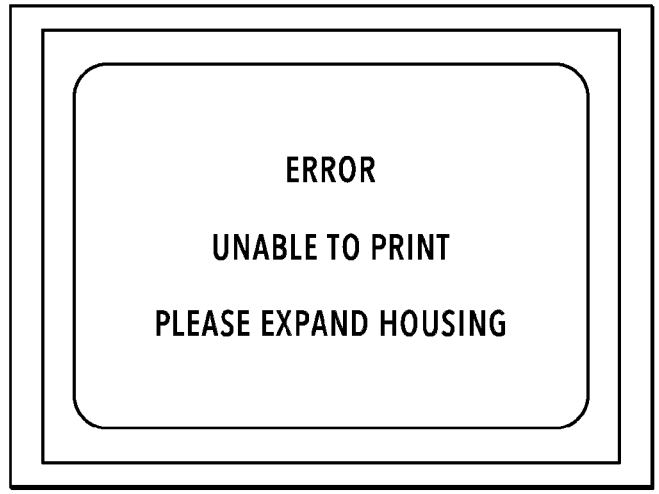
FIGS. 11A, 11B, and 11C are schematic diagrams illustrating display screens to be displayed on the indicator LCD.
Figure 11B:
Figure 11C:

Note that FIGS. 11A to 11C are schematic diagrams illustrating display screens to be displayed on the indicator LCD 105 in the print processing of this embodiment. In the case where the processing transitions from S608 to S609, the UI control module 424 notifies the user to expand the housing of the printing apparatus 100 as illustrated in FIG. 11A through the operating unit 313. Upon receipt of the notification, the user expands the housing of the printing apparatus 100 in S610. As the housing is expanded, the sliding state management application 412 observes information from a sensor in S608. Here, the sensor detects the expansion carried out by the user and the processing transitions from S608 to S611.

Thereafter, in S611, the UI control module 424 notifies the user that the printing is being performed and that the user is not supposed to contract the housing as illustrated in FIG. 11B through the operating unit 313. Then, in S612, the control unit 302 feeds the printing medium 106 set on the feeding port 107 by using the feeding roller 204. Thereafter, in S613, the printer unit 312 performs the printing on the printing medium 106 by use of the printing head 205. After the printing is completed, the control unit 302 discharges the printing medium 106 out of the printing apparatus 100 through the discharging port 109 by using the discharging roller 207 in S614.

Thereafter, in S615, the control unit 302 determines whether or not an unprinted page is included in the printing job received from the host computer 314. If the unprinted page is included, the processing returns to step S612 and the processing from S612 to S615 is repeated. If the unprinted page is not included in the printing job in S615, the UI control module 424 notifies the user of completion of the printing as illustrated in FIG. 11C through the operating unit 313 in S616. Upon receipt of the notification, the user slides the first side case 101 and the second side case 102 by the pushing operation to contract the housing of the expanded printing apparatus 100 in S617 in the case where the printing apparatus 100 is not going to be used continuously, thereby terminating the print processing.

Figure 7:
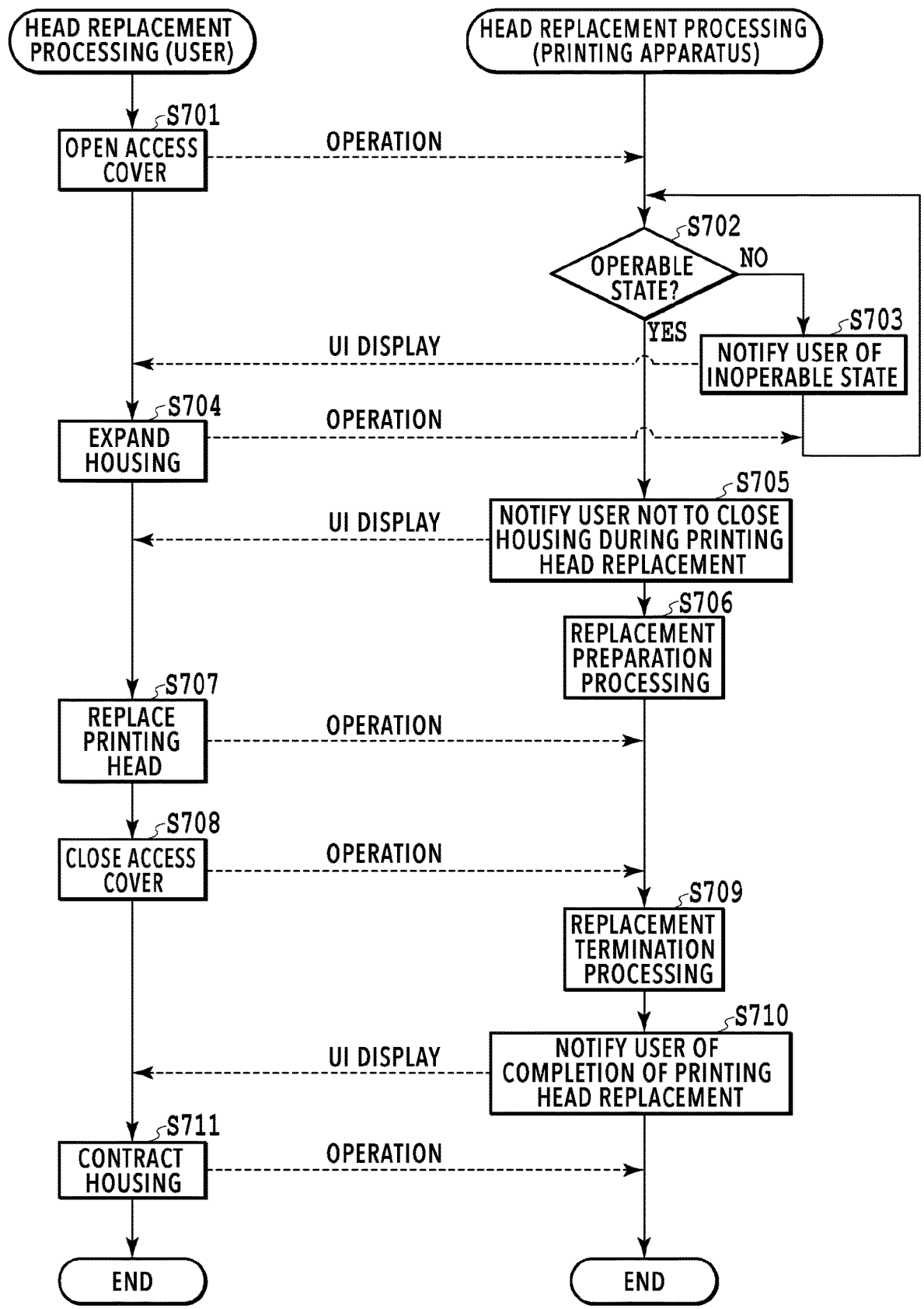
FIG. 7 is a flowchart illustrating printing head replacement processing.

FIG. 7 is a flowchart illustrating processing to be performed by the user and the printing apparatus 100, respectively, in processing to replace the printing head 205, which is processing associated with the printing and is one of maintenance operations of the printing apparatus 100. Operations to be performed by the user are also described herein for the convenience of explanation. Now, the processing by the user and the printing apparatus 100 in the replacement processing will be described below with reference to this flowchart.

As the processing to replace the printing head 205 is started, the user opens the access cover 110 in S701 in order to secure access to the inside of the printing apparatus 100. Detecting that the access cover 110 is opened, the sliding state management application 412 checks whether or not the operable state is established in S702.

Figure 12A:
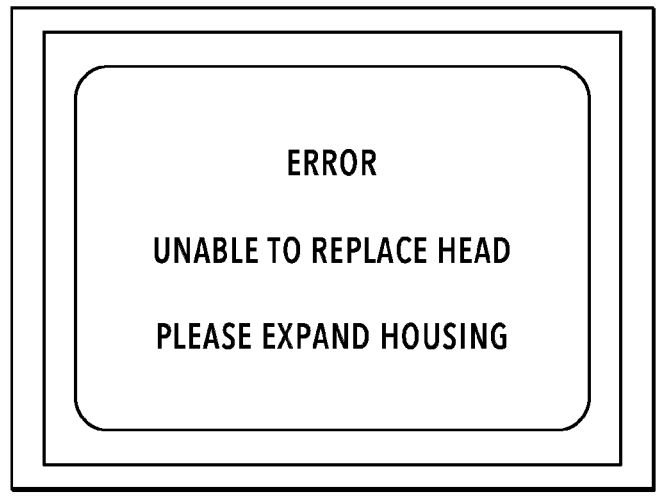
FIGS. 12A, 12B, and 12C are schematic diagrams illustrating display screens to be displayed on the indicator LCD.
Figure 12B:
Figure 12C:
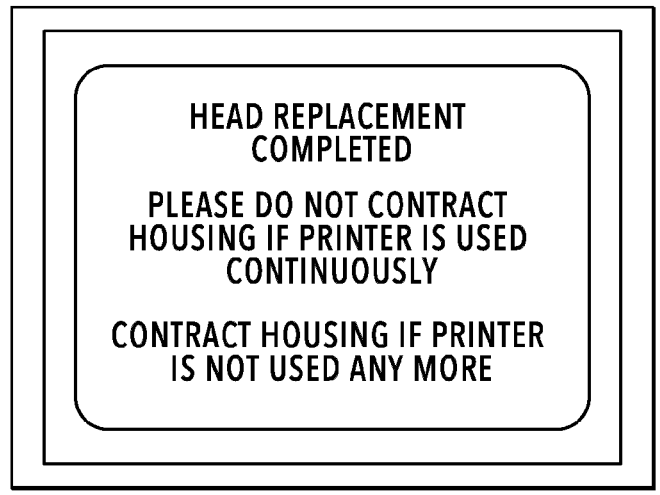

Note that FIGS. 12A to 12C are schematic diagrams illustrating display screens to be displayed on the indicator LCD 105 in the replacement processing of this embodiment. The processing proceeds to S703 if the operable state is not established. In the case where the processing proceeds to S703, the UI control module 424 notifies the user to expand the housing as illustrated in FIG. 12A through the operating unit 313. Upon receipt of the notification, the user expands the housing of the printing apparatus 100 in S704. In the case where the operable state is established in S702, the UI control module 424 notifies the user that the replacement of the printing head 205 is being performed and that the user is not supposed to contract the housing as illustrated in FIG. 12B through the operating unit 313 in S705. Then, the processing proceeds to S706 where the control unit 302 performs replacement preparation processing. Here, the replacement preparation processing is processing to be carried out before the replacement of the printing head 205. For example, the replacement preparation processing is processing to move the carriage 206 to a position where the printing head 205 is replaceable, processing to drain the inks inside the printing head 205, and processing to wipe the ejection port surface which is the surface of the printing head 205 provided with the ejection ports.

Thereafter, in S707, the user replaces the printing head 205 attached to the printing apparatus 100 with the printing head 205 to be used next, and closes the access cover 110 in S708. The sliding state management application 412 of the printing apparatus 100 detects that the access cover 110 is closed, and performs replacement termination processing in S709. Then, in S710, the UI control module 424 notifies the user of completion of the printing head replacement as illustrated in FIG. 12C through the operating unit 313. Upon receipt of the notification, the user slides the first side case 101 and the second side case 102 by the pushing operation to contract the housing in S711 in the case where the printing apparatus 100 is not going to be used continuously, thus terminating the replacement processing.

Although the processing to replace the printing head 205 is carried out in this embodiment after checking whether or not the operable state is established, the present invention is not limited only to this configuration. A different maintenance operation of the printing apparatus 100 may be carried out after checking whether or not the operable state is established. For example, such a different maintenance operation is removal processing in case of a jam of the printing medium, and the like.

As described above, the print processing is carried out on the condition that the housing is moved to the second position. Thus, it is possible to realize a printing apparatus, a printing control method, a processing apparatus, and a program which suppress the occurrence of rework after a start of a printing operation and suppress an output of a printing result not intended by a user due to a mismatch between a state of expansion or contraction and print settings.

Moreover, although this embodiment has explained the printing apparatus that performs the printing as an example, the present invention is not limited only to this configuration. The present invention is also applicable to a processing apparatus that subjects a medium to prescribed processing inclusive of a prescribed processing operation. The present invention is also applicable to an ultraviolet irradiation apparatus, for example.

Second Embodiment

A second embodiment of the present invention will be described below with reference to the accompanying drawings. Note that a basic configuration of this embodiment is the same as that of the first embodiment. Accordingly, a description will be given below of characteristic features of this embodiment.

In the first embodiment, the printing apparatus 100 determines whether or not the operable state is established after the reception of the printing job. Meanwhile, this embodiment is configured to determine whether or not the operable state is established at regular intervals after carrying out the power-on processing on the printing apparatus 100. While the printing apparatus 100 is set to the operable state by the power-on processing on the printing apparatus 100, the operable state is supposed to be checked again due to the reason explained in the first embodiment.

Figure 8:
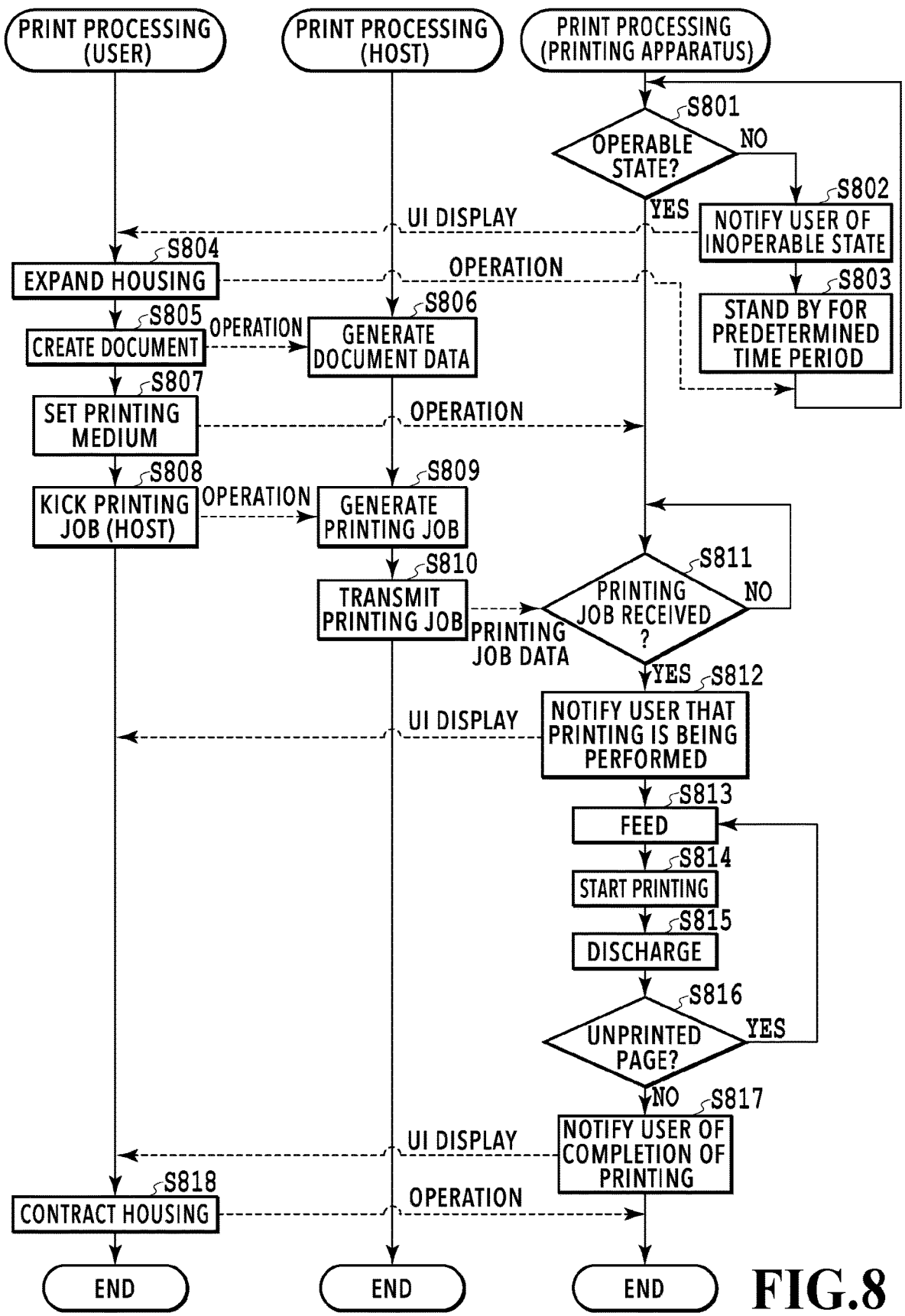
FIG. 8 is a flowchart illustrating print processing.

FIG. 8 is a flowchart illustrating processing to be performed by the user, the host computer 314, and the printing apparatus 100, respectively, in the print processing of this embodiment. Operations to be performed by the user are also described herein for the convenience of explanation. Now, the processing by the user, the host computer 314, and the printing apparatus 100 in the printing processing will be described below with reference to this flowchart.

As the power-on processing (see FIG. 5) is completed, the control unit 302 determines whether or not the printing apparatus 100 is in the operable state in S801. The processing proceeds to S810 if the printing apparatus 100 is determined to be in the operable state in S801, or proceeds to S802 if the printing apparatus 100 is determined to be not in the operable state. In the case where the processing proceeds to S802, the UI control module 424 notifies the user to expand the housing of the printing apparatus 100 as illustrated in FIG. 11A through the operating unit 313.

Thereafter, in S803, the control unit 302 stands by for a predetermined time period and repeats the determination as to whether or not the printing apparatus 100 is in the operable state in S801 until the user expands the housing.

The user who started the print processing confirms the notification and expands the housing of the printing apparatus 100 in S804. Thereafter, the user creates the document to be printed by using the host computer 314 in S805, and the host computer 314 generates the printing data in S806. Thereafter, the user sets the printing medium 106 on the feeding port 107 of the printing apparatus 100 in S807. As the user issues the instruction to start printing to the host computer 314 in S808, the host computer 314 generates the printing job in S809. After generating the printing job, the host computer 314 transmits the generated printing job to the printing apparatus 100 in S810.

As the user expands the housing of the printing apparatus 100 in S804, the processing transitions from S801 to the S811 where the sliding state management application 412 determines whether or not the printing job is received. If the printing job is not received, the determination is repeated until receiving the printing job. In the case where the printing job is received, the UI control module 424 notifies the user in S812 that the printing is being performed as illustrated in FIG. 11B through the operating unit 313. The processing from the S812 onward is the same as the processing from S611 onward in FIG. 6 and the description will therefore be omitted.

Figure 9:
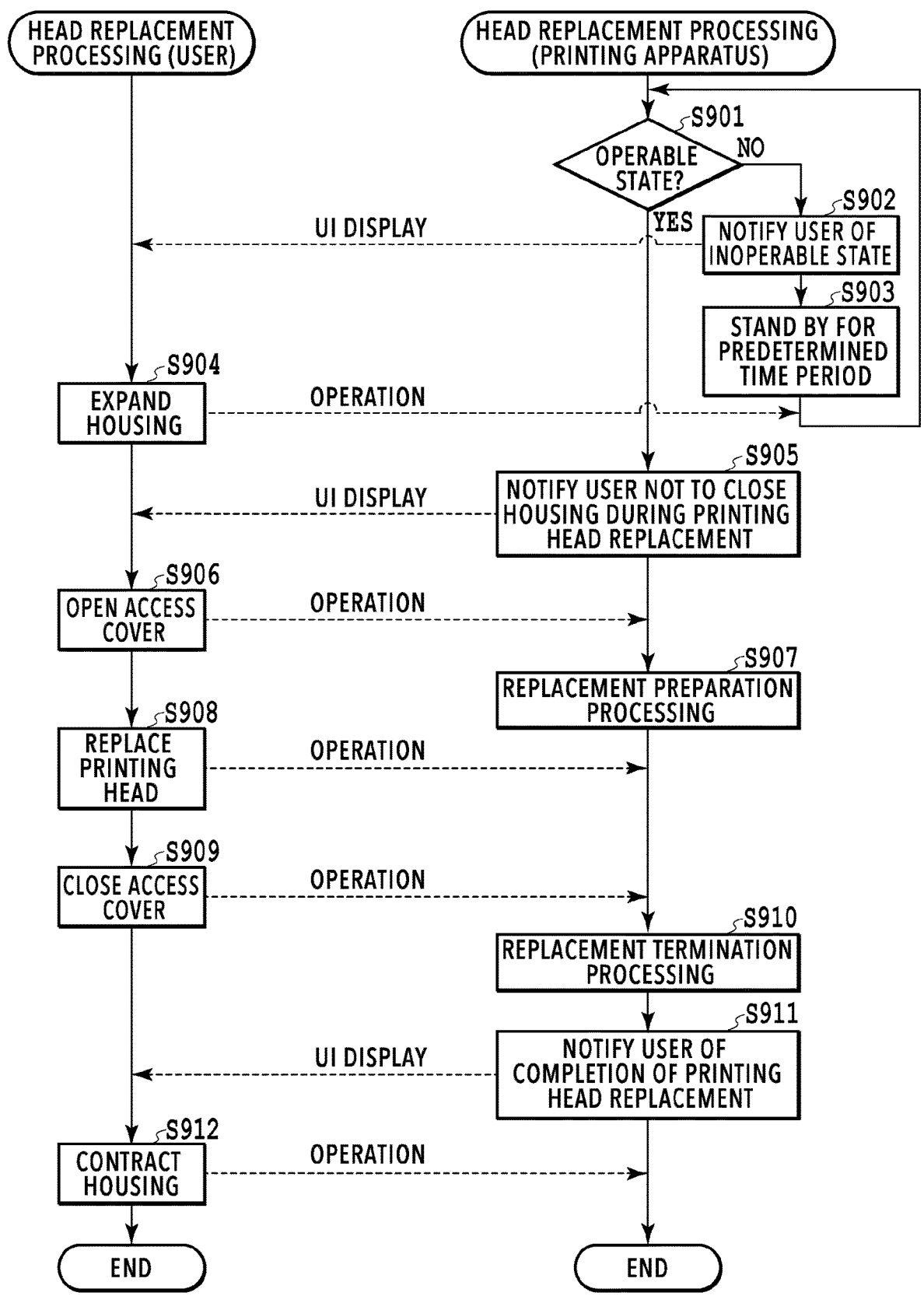
FIG. 9 is a flowchart illustrating printing head replacement processing.

FIG. 9 is a flowchart illustrating processing to be performed by the user and the printing apparatus 100, respectively, in the processing to replace the printing head 205. Operations to be performed by the user are also described herein for the convenience of explanation. Now, the processing by the user and the printing apparatus 100 in the processing to replace the printing head 205 will be described below with reference to this flowchart.

As the power-on processing (see FIG. 5) is completed, the control unit 302 determines whether or not the printing apparatus 100 is in the operable state in S901. The processing proceeds to S902 if the printing apparatus 100 is determined to be not in the operable state. In the case where the processing proceeds to S902, the UI control module 424 notifies the user to expand the housing of the printing apparatus 100 as illustrated in FIG. 12A through the operating unit 313. Thereafter, in S903, the control unit 302 stands by for a predetermined time period and repeats the determination as to whether or not the printing apparatus 100 is in the operable state S901 until the user expands the housing.

The user who started the replacement processing confirms the notification and expands the housing of the printing apparatus 100 in S904. Thereafter, the control unit 302 determines the operable state in S901 and the UI control module 424 notifies the user not to contract the housing during the replacement of the printing head 205 in S905. Then, the user opens the access cover 110 in S906 in order to secure access to the inside of the printing apparatus. The processing from the S907 onward is the same as the processing from S706 onward in FIG. 7 and the description will therefore be omitted.

As described above, after the power-on processing on the printing apparatus 100 is performed, the printing is carried out while determining at regular intervals whether or not the printing apparatus 100 is in the operable state, which is the state of expanding the housing to the second width. Thus, it is possible to realize a printing apparatus, a printing control method, a processing apparatus, and a program which suppress the occurrence of rework after a start of a printing operation and suppress an output of a printing result not intended by a user due to a mismatch between a state of expansion or contraction and print settings.

Other Embodiments

The present invention can also be embodied in the form of supplying a program for realizing one or more functions of any of the above-described embodiments to a system or an apparatus through a network or a storage medium and causing one or more processors of a computer in the system or in the apparatus to read and execute the program. Meanwhile, the present invention can also be embodied in the form of a circuit (such as an ASIC) to realize the one or more functions.

In the meantime, the "notification" is not limited to the mode of displaying on the display unit, and may be issued in the form of sound, for example. Meanwhile, the notification may be displayed on a screen of a host computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-100314 filed May 29, 2019, which is hereby incorporated by reference wherein in its entirety.

What is claimed is:

1. A printing apparatus comprising:
   a printing head configured to move in a first direction and perform printing of an image on a printing medium, wherein the first direction intersects with a conveying direction of the printing medium;
   a conveying roller configured to convey the printing medium in the conveying direction;
   a housing configured to house the printing head and the conveying roller and be expandable and contractible in the first direction; and
   at least one processor configured to cause the printing apparatus to perform predetermined notification based on information related to a length of the housing in the first direction, wherein
   the conveying roller is incapable of conveying the printing medium having a predetermined size in a case where the length of the housing in the first direction is a first length and is capable of conveying the printing medium having the predetermined size in a case where the length is a second length larger than the first length, and
   the predetermined notification is performed in a case where the length of the housing corresponds to the first length, wherein
   the printing head is loaded on a carriage that reciprocates in the first direction,
   the housing is configured to expand and contract by being slid in a sliding direction as the first direction, and
   the carriage moves while being supported by a supporting unit that expands and contracts along with sliding of the housing, wherein
   the at least one processor is configured to obtain position information related to a position of a slidable member in the housing as the information related to the length of the housing in the first direction, and
   the at least one processor performs the predetermined notification based on the obtained information and performs control of the printing and processing associated with the printing, and
   the at least one processor also performs
   first obtainment to obtain the position information on the housing in activation processing in a case of activating the apparatus,
   second obtainment to obtain the position information on the housing in the printing before the printing head performs the printing, and
   third obtainment to obtain the position information on the housing in maintenance processing on the apparatus.

2. The printing apparatus according to claim 1, wherein, in a case where the predetermined notification is performed by the at least one processor, the printing head performs the printing based on the information related to the length of the housing indicating the information corresponding to the first length.

3. The printing apparatus according to claim 1, wherein the printing head starts the printing in a case where the printing head receives a printing command.

4. The printing apparatus according to claim 3, wherein the at least one processor unit performs the predetermined notification if the information represents the information corresponding to the first length in the case where the printing command is received.

5. The printing apparatus according to claim 1, wherein the at least one processor further notifies of information indicating whether the printing is feasible based on the obtained position information.

6. The printing apparatus according to claim 1, wherein the printing head performs the activation processing on a condition that the information obtained in the first obtainment indicates that the member is moved to a position corresponding to the second length.

7. The printing apparatus according to claim 1, wherein the printing head performs the printing on a condition that the information obtained in the second obtainment indicates that the member is moved to a position corresponding to the second length.

8. The printing apparatus according to claim 1, wherein the printing head performs the maintenance processing on a condition that the information obtained in the third obtainment indicates that the member is moved to a position corresponding to the second length.

9. The printing apparatus according to claim 6, wherein the at least one processor further performs notification not to contract the housing until the activation processing is terminated in the case where the member is located at the position corresponding to the second length based on an obtainment result obtained in the first obtainment.

10. The printing apparatus according to claim 7, wherein the at least one processor further performs notification not to contract the housing until the printing is terminated in the case where the member is located at the position corresponding to the second length based on an obtainment result obtained in the second obtainment.

11. The printing apparatus according to claim 8, wherein the at least one processor further performs notification not to contract the housing until the maintenance processing is terminated in the case where the member is located at the position corresponding to the second length based on an obtainment result obtained in the third obtainment.

12. The printing apparatus according to claim 10, wherein the at least one processor further performs notification to contract the housing if the printing by the printing head is completed and the printing is discontinued in the case where the member is located at the position corresponding to the second length based on the obtainment result obtained in the second obtainment.

13. The printing apparatus according to claim 11, wherein the at least one processor further performs notification to contract the housing if the maintenance processing is completed and the maintenance processing is discontinued in the case where the member is located at the position corresponding to the second length based on the obtainment result obtained in the third obtainment.

14. The printing apparatus according to claim 1, wherein
   the second length is a maximum length in the first direction of the housing, and
   the at least one processor performs the predetermined notification in a case where the length of the housing is not the second length.

15. The printing apparatus according to claim 1, wherein
   the at least one processor is configured to obtain data targeted for printing and size information that designates a size of paper used in the printing based on the data, wherein
   the printing head performs the printing of an image based on the obtained data, and
   the at least one processor performs the predetermined notification based on the obtained size information and on the information related to the length of the housing.

16. The printing apparatus according to claim 1, wherein the predetermined notification is performed based on the information related to the length of the housing indicating information corresponding to the first length.

17. A printing control method, comprising:
   a printing step of conveying a printing medium in a conveying direction and performing printing of an image on the printing medium;
   a moving step of moving a housing by expanding and contracting the housing in a first direction intersecting with the conveying direction of the printing medium in the printing step; and
   a notifying step of performing predetermined notification based on information related to a length of the housing in the first direction, wherein
   the printing medium having a predetermined size is not conveyable in the case where the length of the housing in the first direction is a first length and is conveyable in a case where the length is a second length larger than the first length in the printing step, and
   the predetermined notification is performed in the notifying step in a case where the length of the housing corresponds to the first length, and wherein
   the printing head is loaded on a carriage that reciprocates in the first direction,
   the housing expands and contracts by being slid in a sliding direction as the first direction, and
   the carriage moves while being supported by a supporting unit that expands and contracts along with sliding of the housing, and further comprising
   an obtaining step to obtain position information related to a position of a slidable member in the housing as the information related to the length of the housing in the first direction, wherein
   the predetermined notification is performed based on the obtained information, and control of the printing and processing associated with the printing is performed,
   a first obtainment step to obtain the position information on the housing in activation processing in a case of activating the apparatus;
   a second obtainment step to obtain the position information on the housing in the printing before the printing head performs the printing, and
   a third obtainment step to obtain the position information on the housing in maintenance processing on the apparatus.

* * * * *